(12) United States Patent
Cecchetti et al.

(10) Patent No.: US 10,983,781 B2
(45) Date of Patent: Apr. 20, 2021

(54) BLOCKCHAIN COMPUTER DATA DISTRIBUTION

(71) Applicant: Accenture Global Solutions Limited, Dublin (IE)

(72) Inventors: Adam Cecchetti, Seattle, WA (US); Michael Eddington, Seattle, WA (US)

(73) Assignee: Accenture Global Solutions Limited, Dublin (IE)

( * ) Notice: Subject to any disclaimer, the term of this patent is extended or adjusted under 35 U.S.C. 154(b) by 2 days.

(21) Appl. No.: 16/701,214

(22) Filed: Dec. 3, 2019

(65) Prior Publication Data

US 2020/0142686 A1    May 7, 2020

Related U.S. Application Data

(63) Continuation of application No. 15/219,261, filed on Jul. 25, 2016, now abandoned.

(60) Provisional application No. 62/197,541, filed on Jul. 27, 2015.

(51) Int. Cl.
*G06F 8/65* (2018.01)

(52) U.S. Cl.
CPC ..................... *G06F 8/65* (2013.01)

(58) Field of Classification Search
CPC ........................................................ G06F 8/65
See application file for complete search history.

(56) References Cited

U.S. PATENT DOCUMENTS

| | | | |
|---|---|---|---|
| 9,967,334 B2 * | 5/2018 | Ford | H04L 67/20 |
| 10,212,054 B2 * | 2/2019 | Castro | H04L 43/04 |
| 10,310,824 B2 * | 6/2019 | Eksten | G06F 9/44521 |
| 2007/0294362 A1 | 12/2007 | Patel | |
| 2010/0058317 A1 | 3/2010 | Braams | |
| 2011/0131417 A1 | 6/2011 | Swander | |

(Continued)

FOREIGN PATENT DOCUMENTS

CN    1287271 C  *  11/2006  ............. G06F 9/445

OTHER PUBLICATIONS

Mattila et al., "Blockchains as a Path to a Network of Systems", 2015, ETLA (Year: 2015).*

(Continued)

*Primary Examiner* — Wei Y Zhen
*Assistant Examiner* — Junchun Wu
(74) *Attorney, Agent, or Firm* — Fish & Richardson P.C.

(57) ABSTRACT

Blockchain distribution of computer data is disclosed. Computer data can comprise computer code, a computer code segment, a computer command, or a block of computer data, which can be employed by a device to patch software, change a device state, or synchronize data between devices. Blockchain distribution can provide benefits in a heterogeneous device environment, facilitate ad hoc device synchronization, and embody a distributed patch and communications network. Devices can receive a blockchain block from another device and, in some embodiments, enable other devices to access the block from the device. In some embodiments, devices can discard irrelevant blocks, however, an entire blockchain can be reconstructed where partial blockchains can be received from more than one device. Additionally, checkpoint blocks can enable devices to navigate the blockchain efficiently by skipping over known irrelevant blocks.

17 Claims, 10 Drawing Sheets

(56) References Cited

U.S. PATENT DOCUMENTS

| | | | |
|---|---|---|---|
| 2014/0372998 A1 | 12/2014 | Salameh | |
| 2015/0128126 A1 | 5/2015 | Brunet | |
| 2015/0169312 A1 | 6/2015 | Patel | |
| 2015/0304389 A1* | 10/2015 | Chiussi | H04W 4/60 709/203 |
| 2016/0098723 A1* | 4/2016 | Feeney | G06Q 20/065 705/75 |
| 2016/0218879 A1* | 7/2016 | Ferrin | G09C 1/00 |
| 2016/0253159 A1 | 9/2016 | Smith | |
| 2016/0261690 A1* | 9/2016 | Ford | H04L 41/0806 |
| 2016/0306985 A1 | 10/2016 | Seger, II | |
| 2016/0342989 A1* | 11/2016 | Davis | G06Q 20/3674 |
| 2017/0011460 A1* | 1/2017 | Molinari | G06F 21/645 |
| 2017/0236094 A1 | 8/2017 | Shah | |
| 2018/0082294 A1* | 3/2018 | Davis | G06Q 10/00 |
| 2018/0329693 A1* | 11/2018 | Eksten | G06F 16/21 |

OTHER PUBLICATIONS

Foroglou et al., "Further applications of the blockchain", May 2015, ResearchGate (Year: 2015).*

Dennis et al., "Rep on the block : A next generation reputation system based on the blockchain", 2015, IEEE (Year: 2015).*

Czepluch et al., "The Use of Block Chain Technology in Different Application Domains", May 2015, University of Copenhagen (Year : 2015).*

* cited by examiner

BLOCKCHAIN COMPUTER DATA DISTRIBUTION

CROSS-REFERENCE TO RELATED APPLICATIONS

This application is a continuation of U.S. application Ser. No. 15/219,261, filed Jul. 25, 2016, which claims the benefit of U.S. Provisional Patent Application No. 62/197,541, filed on 27 Jul. 2015. Both of these prior applications are incorporated by reference in their entirety.

TECHNICAL FIELD

The disclosed subject matter relates to distribution of computer information and, more particularly, to distribution of computer code, data, or commands via a blockchain mechanism.

BACKGROUND

By way of brief background, information, conventionally, can be stored electronically in data stores. As an example, one common use of a data store is to store computer programming code or source code electronically. As another example, computer commands or data can be stored electronically on a data store, e.g., a network server, data repository, etc. Computers can then receive stored data from the data store and can perform operations based, at least in part, on the received data. The information can comprise computer code, commands, or data. As an example, the information can comprise computer code to enable patching or updating of software on a device, such as but not limited to, updating firmware, patching software, initiating a state change for a state of a device, distribution of data, etc.

DETAILED DESCRIPTION

Figure 1:
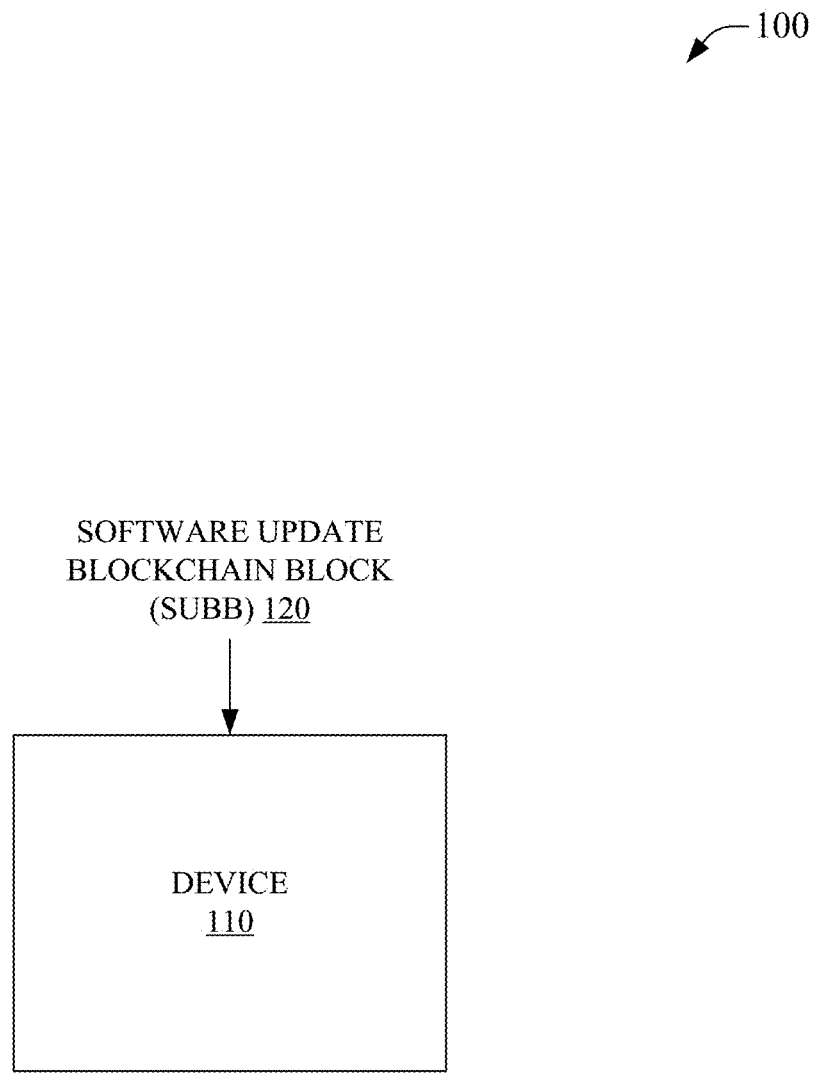
FIG. 1 is an illustration of a system that facilitates computer data distribution via a blockchain in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventionally, information, such as computer programming code, source code, computer commands, or data, can be stored electronically in data stores, for example, the information can comprise computer code to enable patching or updating of software on a device, such as but not limited to, updating firmware, patching software, initiating a state change for a state of a device, distribution of data, etc. Computers can then receive stored data from the data store and can perform operations based, at least in part, on the received data. The data can be stored on data storage components such that the data can be received by devices from the data store, for example, data can be stored on a networked data storage component and can be received by a device via a wired or wireless network connection to the networked data storage component.

In an aspect, storage of data can comprise storage of software patches, firmware updates, etc. For clarity and brevity, the discussion herein is generally in the context of distribution of software patches, although the disclosure is expressly not so limited, and distribution of nearly any electronic information in the manner disclosed herein is expressly within the scope of the present disclosure even where not enumerated or otherwise specifically recited. In view of the foregoing, computer code for a software patch, or simply a patch, can be stored on a data store and can be communicated to and received by a device to implement the patch. The patch can be a firmware update, a software update, an application, e.g., 'app', update, etc. Further as previously disclosed, the patch can comprise commands, data, code, etc., that can be consumed or used by the receiving device.

As computing devices proliferate, the distribution of patches can become increasingly important to effective operation of these many devices. Companies generally dedicate resources to distribution of patches to keep devices associated with those companies operating in an appropriate manner, for example Brand-A smartphones can access a Brand-A operated data store to access and/or receive updates to applications executing on the Brand-A smartphone, Brand-M computers can similarly access/receive software patches via a website operated by Brand-M, etc. This illustrates that conventional distribution of patches typically occurs in a centralized manner, e.g., a company typically controls a data store (or several mirrors, copies, or iterations of the data store) to publish patches to enable updating devices by receiving the patches from the company controlled data store(s). It is not uncommon for these company controlled data stores to be heavily 'siloed,' e.g., storing only patches associated with company approved devices. As an example, it can be normal in conventional techniques for Brand-A to store only patches for Brand-A approved devices the Brand-A data store(s) and for Brand-M to store only patches for Brand-M approved devices the Brand-M data store(s). Where consumers can own devices from many companies, this can result in the different devices each needing to receive patches from many different data store silos. Similarly, even devices from the same company can be relegated to receiving a patch from a silo associated with a particular type, class, model, or identity of the device seeking the patch, for example, a first Brand-H device can be of a first type and a second Brand-H device can be of a second type, wherein a patch for the first type can be received from a first data store and the patch for the second type can be received from another data store even though both the first and second type device(s) are of Brand-H origin. The heterogeneous nature of the modern computing world, therefor, can result in challenges to distribution of patches or other computer data, commands, etc.

Moreover, as the internet of things (IoT) expands, in an aspect, embodying a heterogeneous computing environment with a wide divergence in computational power, storage capacity, electrical power accessibility, etc., for devices, the IoT can present opportunities to deploy patching mechanisms that can be improvements over conventional techniques. In an aspect, a patch can be implemented in a blockchain environment. In a blockchain environment, blocks, which can hold data, can be 'chained' together by storing information in a block indicating the preceding block. A block can further comprise timestamp information and validation information.

The blockchain is relied on heavily by some cryptocurrency systems, in particular for maintaining a cryptoledger associated with the cryptocurrency. In some well-known cryptoledgers, cryptocurrency transactions for a period are stored in a block that is then added to the tail of the blockchain each period, thereby extending the blockchain and enabling the transactional history of the cryptocurrency to be accessed by moving along the blocks of the blockchain. While the blockchain could be held privately, e.g., in a centralized manner, some cryptoledgers are held publically in a less centralized manner for various political, economic, and dogmatic reasons. Aspects of a less centralized blockchain, e.g., where the blockchain is copied to a plurality of blockchain access nodes, etc., include preventing the placement of illegitimate blocks on the blockchain, preventing tampering of blocks already in the blockchain, ensuring that the blockchain is accessible on the blockchain access nodes, etc. Cryptocurrency research has resulting in some accepted blockchain practices, e.g., a majority of blockchain nodes confirms a new block is valid before it is added to the blockchain (e.g., the 51% rule), blocks comprise validation features to prevent tampering with existing blocks of the blockchain (e.g., hash/Merkle trees, elliptical curve cryptography, etc.), and incentivizing blockchain access nodes to be available to process transaction (e.g., rewarding 'miners' to perform computational tasks that keeps the mining device active). Blockchain architectures are generally considered as able to provide independent nodes an ability to converge on a latest version of a data set, even when the nodes are run anonymously, have poor interconnectivity, are subject to operator agenda(s) such as cheating, fraud, attack, etc. Moreover, blockchains, when well designed, can be overwhelmingly difficult to alter, in regard to blocks already in the blockchain.

A blockchain architecture can be employed to store a patch. The patch can then be received by a device via traversing the blockchain. The blockchain, in some embodiments, can be secured in a manner similar to cryptocurrency-type blockchains. In some embodiments, the blockchain can be accessible in an ad hoc manner via blockchain access nodes. In some embodiments, a device accessing the blockchain can also act as a blockchain access node. Further, some embodiments can comprise blocks having patches for heterogeneous computing devices. Moreover, blocks can comprise information comprising at least a portion of a patch, command, or data. Blocks can comprise identifier(s), which in some embodiments, can enable adaptation of access to a patch in a block. In some embodiments, a block can comprise navigation information, e.g., checkpoint information, to allow adapting traversal of a blockchain based on a criterion. Moreover, an embodiment of the disclosed subject matter can comprise some, all, or none of these aspects without departing from, and all such permutations are considered to be within, the scope of the disclosed subject matter.

The following presents other simplified example embodiments of the disclosed subject matter in order to provide a basic understanding of some aspects of the various embodiments. This is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which facilitates computer data distribution via a blockchain in accordance with aspects of the subject disclosure. System 100 can include device 110. Device 110 can comprise a processor and memory. Device 100 can be, for example, a computer, a smartphone, a laptop computer, a tablet computer, a vehicle computer, a computer enabled appliance, a wearable computer, a sensor device, a drone device, or nearly any other computing device, etc. In an embodiment, device 110 can be a computer enabled IoT device. In an embodiment, device 110 can be a member of a swarm of devices, e.g., a device of a group of devices exhibiting collective behavior, etc. Device 110 can comprise a blockchain genesis, seed, tail block, etc., for example, installed at creation of the device by a manufacturer. Blockchain blocks can then be added as a new head block, e.g., a block that is a most recent block of the blockchain, to form a blockchain originating in a tail block, e.g., the earliest block in the blockchain. Traversing the blockchain from the tail to head can therefore, in some embodiments, provide a sequential set of patches from oldest to newest.

Device 110 can receive software update blockchain block (SUBB) 120. SUBB 120 can comprise a patch, e.g., code, code segment, command, data, etc. SUBB 120 can be received from a data store, not illustrated. The data store can be comprised in another device, e.g., a memory of another computing device, etc., a storage device, e.g., a network server, local data store, etc., a blockchain node, etc. A patch of SUBB 120 can be employed, at least in part, by device 110 to perform operations. Operations can comprise updating software/firmware, altering a state of device 110, update data of device 110, etc.

In some embodiments, device 110 can store SUBB 120. In an aspect, device 110 can comprise an amount of memory allocated to storing blockchain block(s), e.g., SUBB 120, etc. Where sufficient allocated memory is available and where SUBB 120 is determined to satisfy a rule relating to storage of SUBB 120, SUBB 120 can be stored by device 110. The rule can relate to a criterion, such as, a date or time of SUBB 120, a size of SUBB 120, a relevancy of SUBB 120, a redundancy of SUBB 120, a ranking of SUBB 120 according to importance of the patch, version of the patch, poll of devices determined to receive the patch, etc., source of SUBB 120, etc. In an aspect, the relevancy of SUBB 120 to device 110 or other devices can be determined and considered in determining storage of SUBB 120 by device 110. In some embodiments, device 110 can discard SUBB 120, e.g., where SUBB 120 is not determined to be stored, for example where device 110 lacks adequate allocated memory, where SUBB 120 does not satisfy the storage rule, etc. As an example, device 110 can discard blocks that are not relevant to device 110, e.g., the stored blocks can all be blocks relevant to device 110 where sufficient allocated memory is available and where other criteria are satisfied. Where another device that can be the same as device 110 communicates with device 110, the stored relevant blocks can be transferred to the other device without needing to replicate the entire blockchain, this aspect is disclosed herein as a 'partial storing node' or other similar terms in contrast to a 'full storing node' or similar term that connotes a node that stores a full blockchain.

In some embodiments, SUBB 120 can be a block of a longer blockchain. In some embodiments, SUBB 120 can be the only block of a blockchain, e.g., a last block, etc. Further, in some embodiments, SUBB 120 can comprise an entire patch, a portion of a patch, a plurality of patches, etc. In embodiments, where SUBB 120 comprises a portion of a patch, other software update blockchain blocks can be received by device 110 that can comprise other portions of the patch, whereby device 110 can reconstruct the patch from the portions. SUBB 120 can comprise a portion of a patch for various reasons, as an example, where a patch is large, e.g., occupies a large amount of memory, the patch can be broken into smaller segments that can each be placed in blocks of the blockchain. This can allow SUBB 120 to be correspondingly smaller in size than were it to comprise an entire patch or a larger segment of the patch. Where SUBB 120 is smaller, it can feasibly be more readily stored on blockchain nodes that have more limited memory resources. As an example, where a patch is 8 Mb and is broken into four 2 Mb portions (ignoring data structure overhead in this example) stored across four blocks of the blockchain, then, for four devices having 5 Mb of allocated memory each, up to two blocks can be stored in each, in contrast to not being able to store the 10 Mb block in any of the four devices. As will be expanded on herein below, the devices, acting as blockchain nodes, can then make the segmented patch available to another device, for example, a device having 20 Mb of allocated storage available. This example can be illustrated as a patch for a tablet computer of 8 MB size is segmented into four 2 Mb size blocks each comprising a segment of the 8 Mb patch. The four 2 Mb size patch segment blocks can then be stored, for example in a connected wristwatch, a connected dog collar, a connected parking meter, and a connected pedometer. The example tablet computer can then receive the four 2 Mb patch segments, e.g., from the watch, the dog collar, the parking meter, and the pedometer, and reassemble the 8 Mb patch therefrom. The tablet computer can then perform operations based on the reassembled 8 Mb size patch.

This aspect can allow storage of larger patches, via segmentation, on IoT type devices that typically have more limited computing/memory resources, to allow propagation of the blockchain in a heterogeneous environment. It is noted that segmentation of a patch, e.g., code, commands, data, etc., can be employed for reasons other than device memory constraints, for example, a patch segment can be communicated faster than an entire patch to facilitate propagation of patch segments in environments where communication is limited, bursty, unreliable, etc., for example where SUBB 120 is communicated between a fixed position device and device 110 as it is in motion past the fixed position device, there may be insufficient time to transmit a larger SUBB 120 in comparison to sufficient time to communicate a smaller SUBB 120. Other reasons for patch segmentation will be readily appreciated and all such examples are considered within the scope of the present disclosure even where not explicitly recited for the sake of clarity and brevity. Other examples can include, but are not limited to, limited electrical power or processing resources of a device comprising a blockchain node can limit hashing of an entire patch in comparison to hashing a patch segment, a communications modality limitation, a device density rule (higher density can favor patch segments), a load balancing rule, etc.

Figure 2:
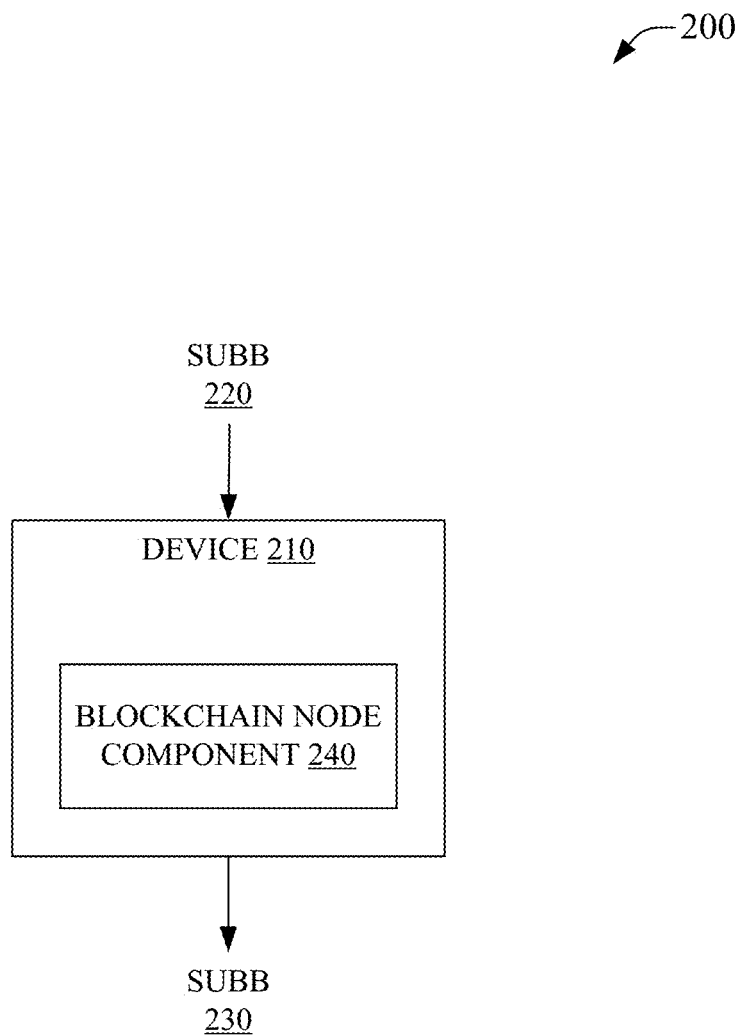
FIG. 2 is a depiction of a system that facilitates computer data distribution via a blockchain node component in accordance with aspects of the subject disclosure.

FIG. 2 is a depiction of a system 200 that can facilitate computer data distribution via a blockchain node component in accordance with aspects of the subject disclosure. System 200 can include device 210. Device 210 can comprise a processor and memory. Device 200 can be, for example, a computer, a smartphone, a laptop computer, a tablet computer, a vehicle computer, a computer enabled appliance, a wearable computer, a sensor device, a drone device, or nearly any other computing device, etc. In an embodiment, device 210 can be a computer enabled IoT device. In an embodiment, device 210 can be a member of a swarm of devices, e.g., a device of a group of devices exhibiting collective behavior, etc.

Device 210 can comprise blockchain node component 240 that can store a blockchain genesis, seed, tail block, etc., for example, installed at creation of the device by a manufacturer. Blockchain blocks can then be added to a new head block to form a blockchain originating from a tail block. Traversing, in some embodiments, the blockchain from the tail to the head, or from the head to the tail, therefore, can provide a sequential set of patches via blockchain node component 240.

Device 210 can receive SUBB 220. SUBB 220 can comprise a patch, e.g., code, code segment, command, data, etc. SUBB 220 can be received from a data store, not illustrated. The data store can be comprised in another device, e.g., a memory of another computing device, etc., a storage device, e.g., a network server, local data store, etc., a blockchain node component of another device, etc. A patch of SUBB 220 can be employed, at least in part, by device 210 to perform operations. Operations can comprise updating software/firmware, altering a state of device 210, update data of device 210, etc.

In some embodiments, device 210 can store SUBB 220. In an aspect, device 210 can comprise an amount of memory allocated to storing blockchain block(s), e.g., SUBB 220, etc. Where sufficient allocated memory is available and where SUBB 220 is determined to satisfy a rule relating to storage of SUBB 220, SUBB 220 can be stored by device 210. The rule can relate to a criterion, such as, a date or time, size in memory, a relevancy, a redundancy, a ranking according, such as, to importance, etc., of the patch, version, number of child devices estimated to receive the patch via blockchain node component 240, etc., source, etc. In an aspect, the relevancy of SUBB 220 to device 210 or other devices can be determined and considered in determining storage of SUBB 220 by device 210. In some embodiments, device 210 can discard SUBB 220. As an example, device 210 can discard blocks that are not relevant to device 210.

Device 210 can enable access to SUBB 230. SUBB 230 can be the same as, or similar to, SUBB 220. In some embodiments, device 210 can store SUBB 220 and allow access to SUBB 220 as SUBB 230. As such, SUBB 230 can be the same as SUBB 220. In some embodiments, a patch can be extracted from SUBB 220 and used to create SUBB 230. As such, SUBB 230 can be similar to SUBB 220. In some embodiments, SUBB 230 can be part of a side chain, e.g., where SUBB 230 is derived from a patch extracted from SUBB 220, the patch data can be added to a block having data indicating a previous block in a side chain, sub-chain, etc. This aspect can be useful, for example, where the full blockchain comprises many blocks that are not relevant to a device type associated with device 210, a side chain can be formed that is more compact and has a higher density of blocks relevant to the device type of device 210, such that other devices of the same or similar device type can receive, in some circumstances, the side blockchain in lieu of the full blockchain, e.g., limited memory, limited communication, a more homogeneous area of devices, etc. In these circumstances, blockchain node component 240 can act as a partial storing node rather than a full storing node.

In some embodiments, SUBB 220 can be a block of a longer blockchain. In some embodiments, SUBB 220 can be the only block of a blockchain, e.g., a last block, etc. Further, in some embodiments, SUBB 220 can comprise an entire patch, a portion of a patch, a plurality of patches, etc. In embodiments, where SUBB 220 comprises a portion of a patch, other SUBBs can be received by device 210 that can comprise other portions of the patch, whereby device 210 can reconstruct the patch from the portions. In some embodiments, such as where identifier information of the patch segments enable determining that the patch is not relevant to device 210, etc., device 210 can refrain from reconstructing the entire patch from the patch segments received by way of one or more SUBBs including SUBB 220. Moreover, the received SUBB 220 can still be shared as SUBB 230 with, or without, reconstruction of an entire patch from patch segments by device 210.

In an aspect, segmentation can enable storage of larger patches on IoT type devices, typically limited computing/memory resources, or other limited memory device, to allow propagation of the blockchain in a heterogeneous environment. Segmentation of a patch, e.g., code, commands, data, etc., can be employed for reasons other than device memory constraints, for example, a patch segment can be communicated faster than an entire patch to facilitate propagation of patch segments in environments where communication is limited, bursty, unreliable, etc., for example where SUBB 220 is communicated between a user carrying a first device in one direction down a hallway and device 210 as it is carried in the opposite direction down the hallway and passes the first device, there may be only a short time to transmit SUBB 220, typically meaning that a shorter SUBB can be more likely to fit in the limited transmission time window. Other reasons for patch segmentation are considered within the scope of the present disclosure even where not explicitly recited for the sake of clarity and brevity. Other examples can include, but are not limited to, limited electrical power or processing resources of a device comprising a blockchain node can limit hashing of an entire patch in comparison to hashing a patch segment, a communications modality limitation, a device density rule (higher density can favor patch segments), a load balancing rule, etc.

Figure 3:
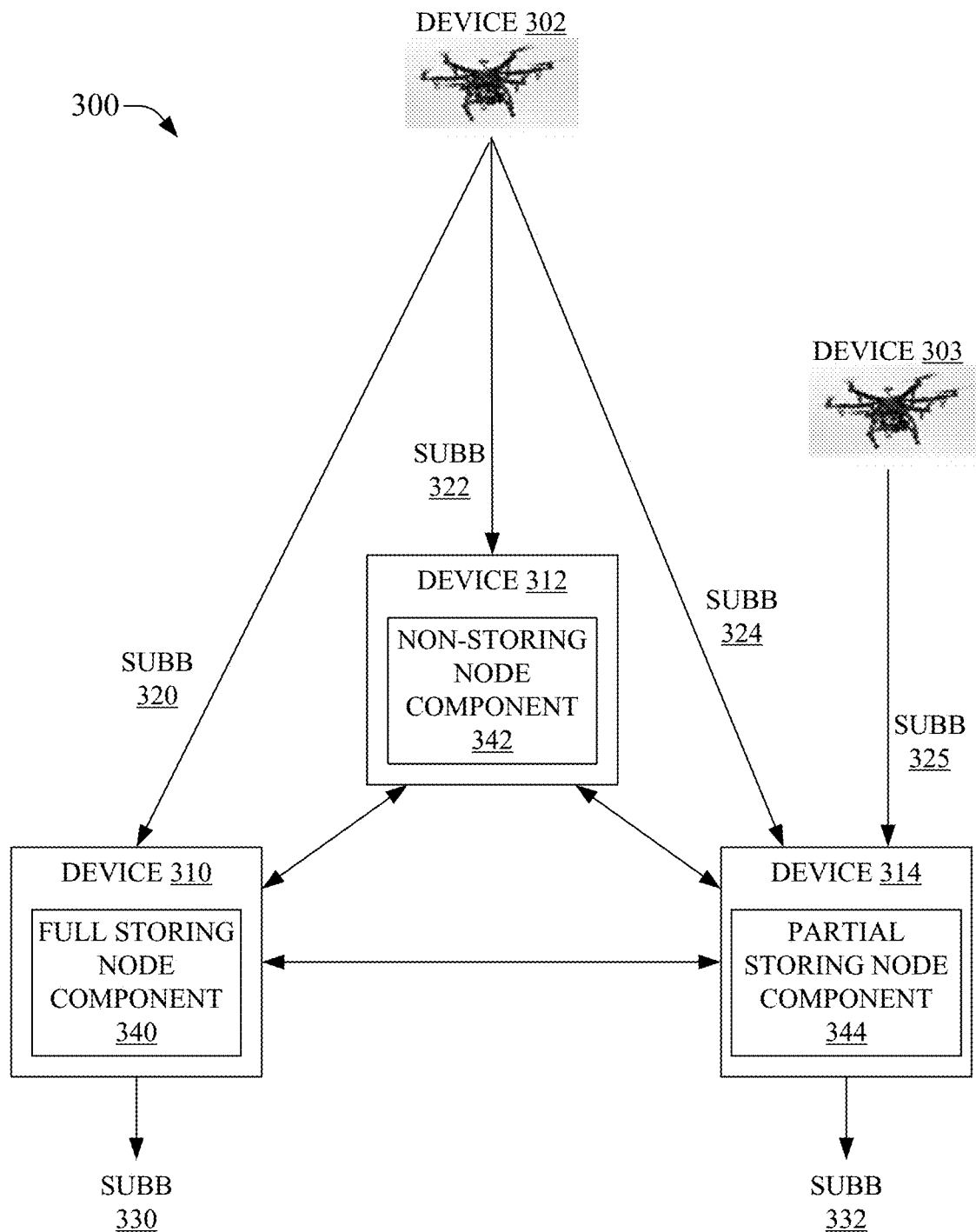
FIG. 3 illustrates a system that facilitates blockchain distribution of segmented computer data in accordance with aspects of the subject disclosure.

FIG. 3 illustrates a system 300 that facilitates blockchain distribution of segmented computer data in accordance with aspects of the subject disclosure. System 300 can include device 310, 312, and 314. Devices 310-314 can each comprise a processor and memory. Devices 300-314 can be, for example, a computer, a smartphone, a laptop computer, a tablet computer, a vehicle computer, a computer enabled appliance, a wearable computer, a sensor device, a drone device, or nearly any other computing device, etc. In an embodiment, devices 310-314 can be computer enabled IoT devices. In an embodiment, devices 310-314 can be members of a swarm of devices, e.g., devices of a group of devices exhibiting collective behavior, etc.

Devices 310-314 can comprise blockchain node components, e.g., 340-344, respectively, that can each store a blockchain genesis, seed, tail block, etc. Blockchain blocks can then be added as new head blocks to form blockchains originating from tail blocks. Devices 310-314 can communicate with other devices, including other devices of devices 310-314. This communication can allow devices 310-314 to share information among the devices 310-314, for example, patches extracted from SUBBs received by the respective devices can be shared with other devices including devices 310-314. Traversing a blockchain from a tail to a head, or from a head to a tail, can provide a sequential set of patches via blockchain node components, e.g., 340 and 344. Note that non-storing node component 342 can comprise only the genesis, seed, tail block, etc., while full storing node component 340 can store a full blockchain, and partial storing node component 344 can store up to, but typically less than, a full blockchain.

Devices 310-314 can receive SUBB 320, 322, 324, and 325, as illustrated. SUBB 320-325 can each comprise a patch, e.g., code, code segment, command, data, etc. SUBB 320-325 can be received from a data store of device 302 or 303, as illustrated. The data stores can be comprised in a memory of device 302, 303, etc., a storage device, data store of device 302, 303, etc., a blockchain node component of device 302, 303, etc. A patch of SUBB 320-325 can be employed, at least in part, by a device 310-314 to perform operations, e.g., SUBB 320 can be employed by device 310, SUBB 322 can be employed by device 310-314 via communications between devices 310-314, SUBB 325 can be employed by device 310-314 via communications between devices 310-314, etc. Operations can comprise updating software/firmware, altering a state of device 310-314, update data of device 310-314, etc.

In some embodiments, devices 310-314 can each store SUBB 320-325, either as directly communicated to device 310-314 from device 302 or 323, or as communicated to device 310-314 as communicated from another device of devices 310-314. In an aspect, devices 310-314 can each comprise an amount of memory allocated to storing blockchain block(s), e.g., SUBBs 320-325, etc. Where sufficient allocated memory is available and where SUBBs 320-325 are determined, by blockchain node component, e.g., 340-344, to satisfy a rule relating to storage of SUBB 320-325, SUBB 320-325 can be stored by one or more of devices 310-314. Of note, non-storing node component 342 can determine that no SUBB is to be stored by device 312 regardless of available memory or other criterion, partial storing node component 344 can determine to store up to a full blockchain of SUBBs at device 314, and full storing node component 340 can determine to store a full chain of SUBBs at device 310 up to the allocated memory and other criteria. The rule can relate to a criterion, such as, a date or time, size in memory, a relevancy, a redundancy, a ranking according, such as, to importance, etc., of the patch, version, number of child devices estimated to receive the patch via blockchain node components, e.g., 340-344, etc. In an aspect, the relevancy of SUBB 320-325 to each of devices 310-314 or other devices can be determined and considered in determining storage of one or more of SUBB 320-325 by respective devices 310-314. In some embodiments, each of devices 310-314 can discard one or more of SUBBs 320-325. As an example, device 310 can discard block 320 where it is not relevant to device 310, device 310 can discard block 325 where it is not relevant to device 310, device 314 can discard each of blocks 320-325 where they are not relevant to device 310, etc.

Devices 310 and 314 can enable access to SUBBs 330 and 332, respectively. SUBBs 330-332 can be the same as, or similar to, at least one of SUBB 320-325. As examples, SUBB 330 can be the same as, or similar to, SUBB 320, SUBB 330 can be the same as, or similar to, SUBB 325, SUBB 332 can be the same as, or similar to, SUBB 325, etc. In some embodiments, devices 310-314 can store SUBBs 320-325 and allow access thereto. As such, SUBB 330 can be the same as one of SUBB 320-325, SUBB 332 can be the same as one of SUBB 320-325, etc. In some embodiments, a patch can be extracted from one or more of SUBBs 320-325 and used to create at least one of SUBBs 330-332. As such, SUBB 330 can be based on, or similar to, one or more of SUBBs 320-325. In some embodiments, one or more of SUBBs 330-332 can be part of one or more side chains, e.g., where SUBB 330 is derived from a patch extracted from SUBB 320, the patch data can be added to a block having data indicating a previous block in a side chain, sub-chain, etc. This aspect can be useful, for example, where the full blockchain comprises many blocks that are not relevant to a device type associated with device 310, a side chain can be formed that is more compact and has a higher density of blocks relevant to the device type of device 310, such that other devices of the same or similar device type can receive, in some circumstances, the side blockchain in lieu of the full blockchain, e.g., limited memory, limited communication, a more homogeneous area of devices, etc. In these circumstances, partial storing node component 344 can store some SUBBs, up to a full blockchain. Of note, devices 310-314 can communicate SUBBs with other devices 310-314, can communicate patches extracted from SUBBs 320-325, etc. As an example, device 302 can communicate SUBB 320 to device 310, which can then communicate SUBB 330 to another device or to device 312 or 314. As another example, device 302 can communicate SUBB 320 to device 310, which can then communicate a patch from SUBB 330 to another device or to device 312 or 314. In an aspect, a SUBB can be hashed and represent the patch in a compact format but can require description of the hash to access the patch itself. In an aspect, the patch can be less compact than a hash of the patch but can avoid decryption associated with a SUBB. As such, inter-device communication, e.g., between devices of devices 310-314, can be via sharing a patch and/or sharing a SUBB associated with the patch. It should also be noted that sharing a patch itself can be devoid of sharing information about a block of the blockchain that can comprise the patch, e.g., the SUBB is a block in the blockchain that typically comprises a hash of the patch, the patch is simply the patch without any block information.

In some embodiments, one or more of SUBBs 320-325 can be a block of a longer blockchain. In some embodiments, one or more of SUBBs 320-325 can be an only block of a blockchain, e.g., a last block, etc. Further, in some embodiments, one or more of SUBBs 320-325 can comprise an entire patch, a portion of a patch, a plurality of patches, etc. In embodiments, where at least one of SUBBs 320-325 comprise a portion of a patch, other SUBBs, e.g., another of SUBB 320-325, can be received by a device, e.g., 310-314, that can comprise other portions of the patch, whereby the device can reconstruct the patch from the portions. In some embodiments, such as where identifier information of the patch segments enable determining that the patch is not relevant to a device, e.g., 310-314, etc., the device can refrain from reconstructing the entire patch from the patch segments received by way of one or more of SUBBs 320-325. Moreover, a received SUBB, e.g., 320-325, can still be shared as one or more of SUBBs 330-332 with, or without, reconstruction of an entire patch from received patch segments by a device, e.g., 310-314. As an example, where SUBB 320 comprises a hash of a first patch segment, SUBB 325 can comprise a hash of a related second patch segment, such that the first and second patch segments can be decrypted from their hashes and reconstructed to form an entire patch. As another example, where SUBB 320 comprises a hash of a first patch segment, SUBB 325 comprises a hash of a related second patch segment, and device 314 determines from the either SUBB 320 or 325 that the patch is not relevant to device 314, even though the first and second patch segments can be decrypted from their hashes and reconstructed to form an entire patch, device 314 can refrain from decryption, where after partial storing node component 344 can share, but is not required to share, SUBB 320 and/or 325 with other devices, e.g., via sub 332.

In an aspect, segmentation can enable storage of larger patches on IoT type devices, typically limited computing/memory resources, or other limited memory device, to allow propagation of the blockchain in a heterogeneous environment. Segmentation of a patch, e.g., code, commands, data, etc., can be employed for reasons other than device memory constraints, for example, a patch segment can be communicated faster than an entire patch to facilitate propagation of patch segments in environments where communication is limited, bursty, unreliable, etc., for example where SUBB 320 is communicated to device 310 as it travels through a spotty wireless network environment, there may be only a short period to transmit SUBB 320 between wireless network drops, typically meaning that a shorter SUBB can be more likely to fit in the limited transmission time window. Other reasons for patch segmentation are considered within the scope of the present disclosure even where not explicitly recited for the sake of clarity and brevity. Other examples can include, but are not limited to, limited electrical power or processing resources of a device comprising a blockchain node can limit hashing of an entire patch in comparison to hashing a patch segment, a communications modality limitation, a device density rule (higher density can favor patch segments), a load balancing rule, etc.

Figure 4:
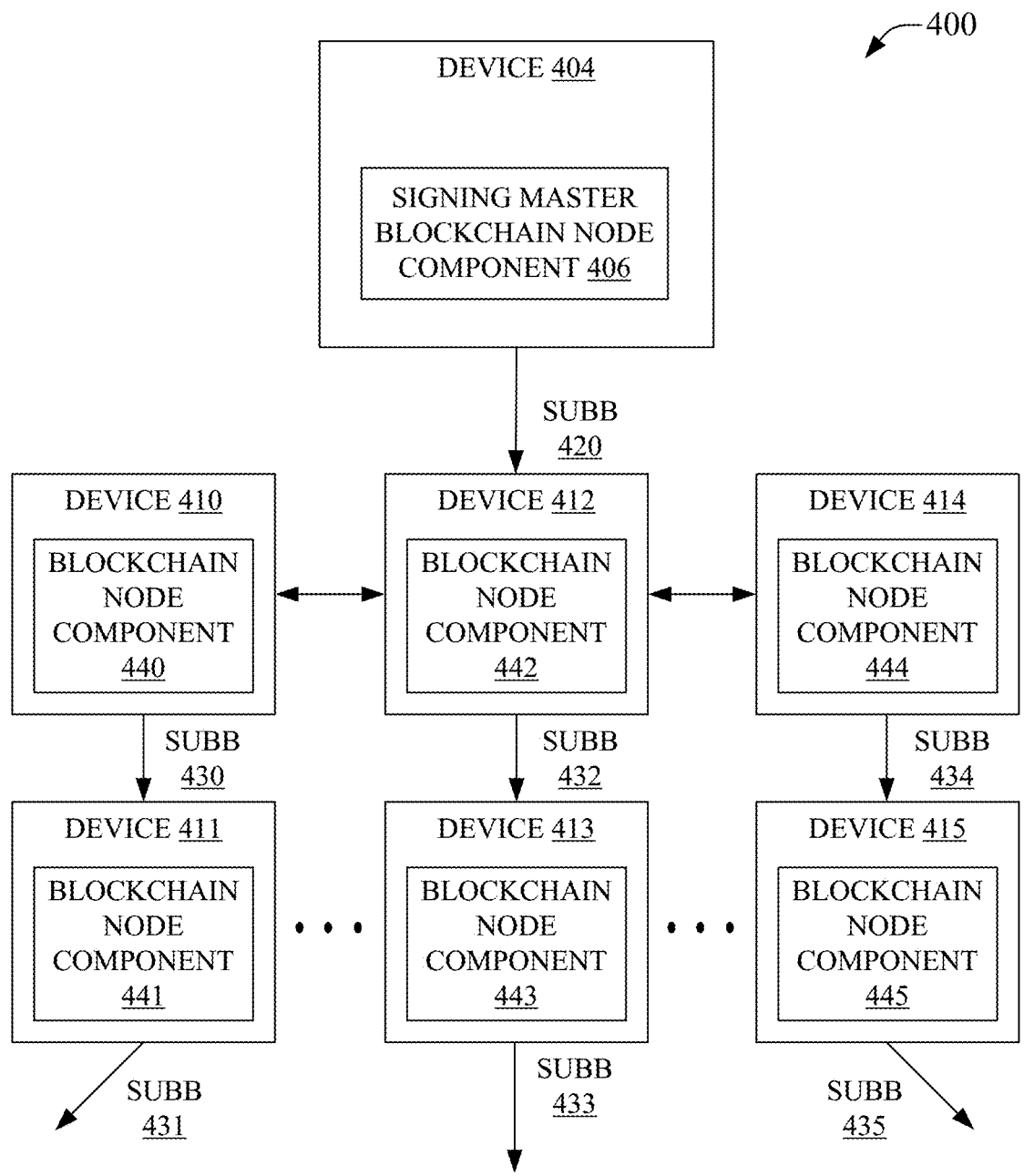
FIG. 4 illustrates a system that facilitates computer data distribution via a distributed blockchain node architecture in accordance with aspects of the subject disclosure.

FIG. 4 illustrates a system 400 that facilitates computer data distribution via a distributed blockchain node architecture in accordance with aspects of the subject disclosure. System 400 can include devices 404-415. Devices 404-415 can each comprise a processor and memory. Devices 404-415 can each be, for example, a computer, a smartphone, a laptop computer, a tablet computer, a vehicle computer, a computer enabled appliance, a wearable computer, a sensor device, a drone device, or nearly any other computing device, etc. In an embodiment, devices 404-415 can be computer enabled IoT devices. In an embodiment, devices 404-415 can be members of a swarm of devices, e.g., devices of a group of devices exhibiting collective behavior, etc.

Devices 404-415 can comprise blockchain node components, e.g., 406-445, respectively, that can each store a blockchain genesis, seed, tail block, etc. Blockchain blocks can then be added as new head blocks to form blockchains originating from tail blocks. Devices 404-415 can communicate with other devices, including other devices of devices 404-415. This communication can allow devices 410-414 to share information among the devices 404-415, for example, SUBBs, e.g., 420-435, received by the respective devices can be shared with other devices including devices 404-415. Traversing a blockchain, in some embodiments, from a tail to head (oldest to newest), or from head to a tail (newest to oldest), can provide a sequential set of patches via one or more blockchain node component, e.g., 406-445.

As illustrated in system 400, devices 412 can receive SUBB 420 from device 404 via signing master blockchain node component 406. In an embodiment, signing master blockchain node component 406 can be a node component associated with a source of SUBBs for inclusion on a blockchain, for example, a device manufacturer can publish a new firmware update via SUBB 420 for dissemination via signing master blockchain node component 406 of device 404. SUBB 420 can comprise a patch, e.g., code, code segment, command, data, etc. SUBB 420 can be received from a data store of device 404 via signing master blockchain node component 406. The data stores can be comprised in a memory of device 404, a storage device of device 404, signing master blockchain node component 406 of device 404, etc. A patch hashed in SUBB 420 can be employed, at least in part, by a device 412 to perform operations, e.g., SUBB 420 can be employed by device 412. Similarly, devices 414 and/or 410 can employ SUBB 420, and/or a patch decrypted from SUBB 420, shared with them from device 412. Operations can comprise updating software/firmware, altering a state of device 410-414, update data of device 410-414, etc. Devices 410-414 can, via blockchain node component 440, 442, and 444 respectively, disseminate SUBB 430, 432, and 434. SUBB 430, 432, and 434 can each be the same as, or similar to, SUBB 420. In an embodiment wherein device 410, 412, and 414 act purely as a distribution layer of devices, SUBB 430, 432, and 434 can be the same as SUBB 420.

Device 411 can receive SUBB 430, device 413 can receive SUBB 432, and device 415 can receive SUBB 434. Correspondingly, device 411 can enable access to SUBB 431, device 413 can enable access to SUBB 433, and device 415 can enable access to SUBB 435, via blockchain node component 441, 443, and 445 respectively. SUBB 431, 433, and 435 can each be the same as, or similar to, SUBB 430, 432, and 434, respectively. In an embodiment wherein device 411, 413, and 415 act purely as another distribution layer of devices, SUBB 431, 433, and 435 can be the same as SUBB 420. A patch hashed in SUBB 430, 432, and 434, can respectively be employed, at least in part, by device 411, 413, and 415, to perform operations. As such, system 400 illustrates aspects of distributing and/or use of a blockchain.

Figure 5:
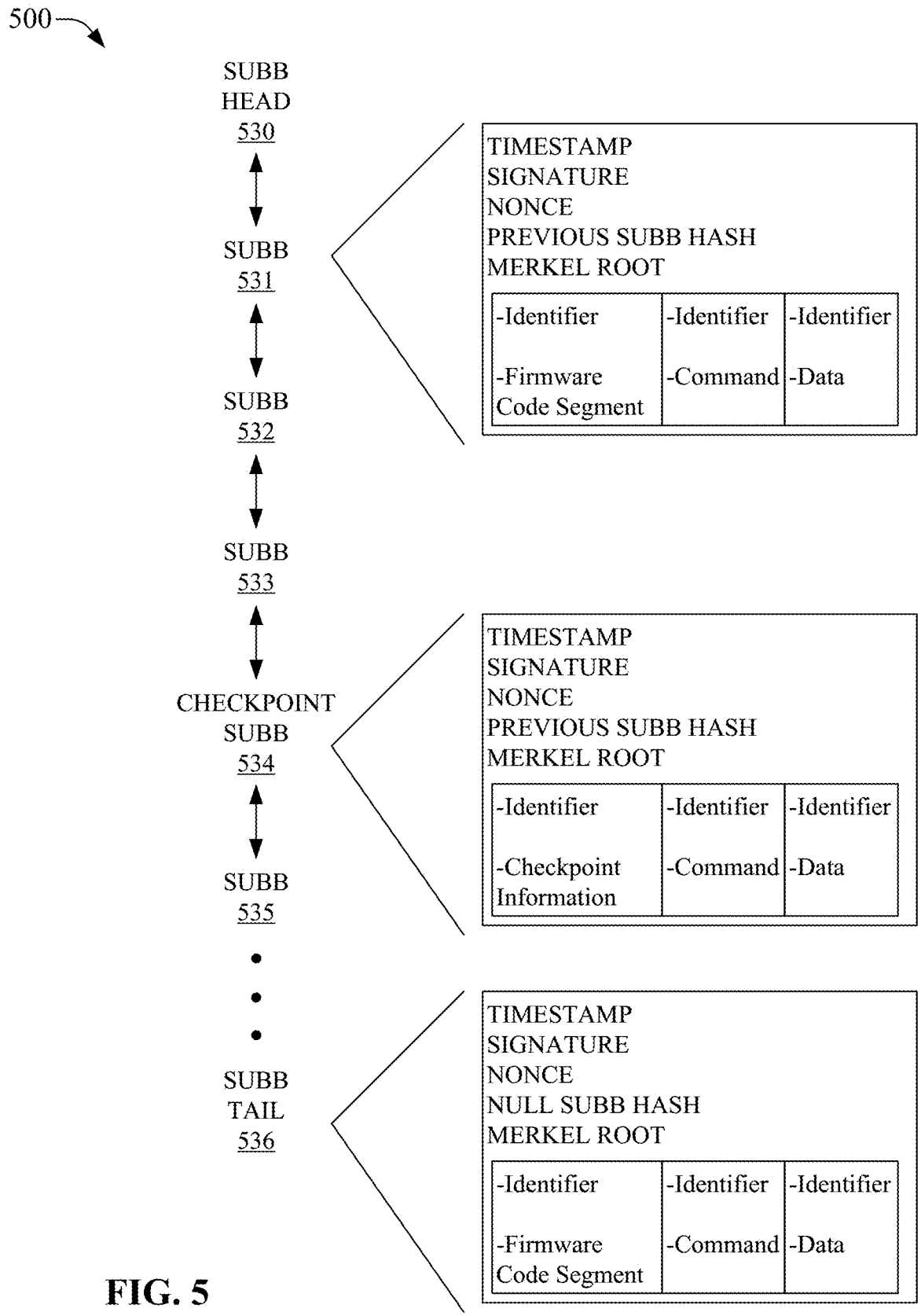
FIG. 5 is a depiction of a system that facilitates computer data distribution via a blockchain comprising a plurality of block types in accordance with aspects of the subject disclosure.

FIG. 5 is a depiction of a system 500 that facilitates computer data distribution via a blockchain comprising a plurality of block types in accordance with aspects of the subject disclosure. System 500 can include SUBB head 530 that can be linked or chained to SUBB tail 536 via SUBB 531, SUBB 532, SUBB 533, checkpoint SUBB 534, SUBB 535, etc. SUBB head 531, SUB 532-533, 535, etc., checkpoint SUBB 534 and SUBB tail 536, collectively SUBB 530-536, can each comprise a patch, e.g., code, code segment, command, data, etc. SUBB 530-536 can represent a blockchain that facilitates computer data distribution. In some embodiments, SUBB 530-536 can be received by devices, e.g., 110, 210, 302, 303, 310-314, 404, 410-415, etc. SUBB 530-536 can be stored in device data stores that can comprise a memory of device, a storage device, a blockchain node component of a device, etc., as disclosed elsewhere herein. A patch can be hashed and comprised in SUBB 530-536 such that it can be decrypted and employed, at least in part, by a device to perform operations, e.g., SUBB 530-536 can be employed by a device. Operations can comprise updating software/firmware, altering a state of a device, update data of a device, etc.

SUBB tail 536 can be a blockchain genesis, seed, tail block, etc. Blockchain blocks, e.g., SUBB 530-535, etc., can then be added as new head blocks to form blockchains originating from a tail block, e.g., SUB tail 536. Traversing a blockchain from a tail to a head can provide a sequential set of patches from oldest to newest via one or more blockchain node component as disclosed hereinabove. SUBB tail 536 can comprise a timestamp, signature, nonce, null SUBB hash, Merkle root, and data values comprising an identifier and a payload, wherein the payload can be a firmware or other code segment, a command, or other data. While other payloads can be included, for the sake of clarity and brevity they are not discussed further, although all such payloads are within the scope of the present disclosure where they relate to distribution of computer data via a blockchain-type architecture.

The timestamp can represent an approximate time of creation of the block, e.g., SUBB tail 536. The signature can represent an authentication of the validity of the block and, in some embodiments can be the same as, or similar to, proof of work as might be found in a cryptocurrency-type blockchain block. In cryptocurrency, the proof of work is frequently a value that is easy to verify but difficult to compute, which acts as a security measure to prevent blocks from being modified. The signature can therefore be employed to validate the block in that determining the signature is sufficiently time consuming as to prevent computational systems from modifying all subsequent blocks in before new blocks are mined and exposing the illicit attempt at modification. The nonce can be a value that when hashed with the block content, e.g., payload, the result is within a determined range of values. The null SUBB hash, or previous SUBB hash in blocks other than SUBB tail 536, can be a cryptographic hash of the previous block, however for the tail block, there is no earlier block and a null SUBB hash value can be used. The Merkle root can be a value from a hash tree and can allow verification of a hashed payload. In some embodiments, the signature and Merkle root verification can be substituted with other techniques than those explicitly disclosed herein without departing from the disclosed subject matter and those alternate techniques are not disclosed herein simply for the sake of clarity and brevity.

The identifier can enable identification of the payload. This can be valuable in a heterogeneous device environment by allowing a device to determine, based on the identifier, if the payload is relevant for the device. Relevancy can be premised on, for example, the type of device, model of the device, series of the device, age of the device, attributes of the device, brand of the device, code versions, etc. As an example, a device of Brand A can, from the identifier, determine that a payload if for a Brand A device and indicate that the payload, e.g., code, command, data, is relevant and should be received by the device. As another example, a Brand A device can determine, based on the identifier, that the payload is for a Brand A device of model AA through AV, however the Brand A device can be of model BQ and the payload can be indicated as not relevant, whereby the block can, for example, be deleted, decrypting the payload can be avoided, etc.

Checkpoint SUBB 534 can comprise checkpoint information as a payload. As before, the identifier can be employed to determine which devices may find the checkpoint information relevant. The checkpoint information can be based on a determination that one or more subsequent bocks of the blockchain, typically many subsequent blocks, are not relevant to devices associated with the identifier. The checkpoint information can be employed to jump ahead in the blockchain and avoid the previously identified irrelevant blocks of the blockchain. This can act as a shortcut for devices associated with the identifier of the checkpoint information. As an example, for an older device that is no longer supported by a manufacturer, new blocks can be non-existent after the end of support date, as such, a checkpoint block can be inserted into the chain comprising checkpoint information that indicates that no blocks after the checkpoint block will be relevant to the older device. Where the example older device traverse the block chain from SUBB tail 536 to checkpoint SUBB 534, the identifier of the checkpoint information can be deemed relevant to the older device such that the older device can be provided information that no further relevant blocks are to be found in the blockchain after checkpoint SUBB 534. This can enable the older device to avoid consuming resources to traverse the balance of the blockchain after checkpoint SUBB 534. In another example, checkpoint SUBB 534 can comprise checkpoint information that indicates that the next relevant block is several thousand blocks more recent, this information can be employed by a device to skip over these several thousand blocks, thereby avoiding the consumption of resource associated with traversing the same. In the IoT paradigm, where devices can frequently have limited computational, memory, and power resources available, the checkpoint can be a valuable improvement over having to traverse the entire blockchain by each device.

Figure 6:
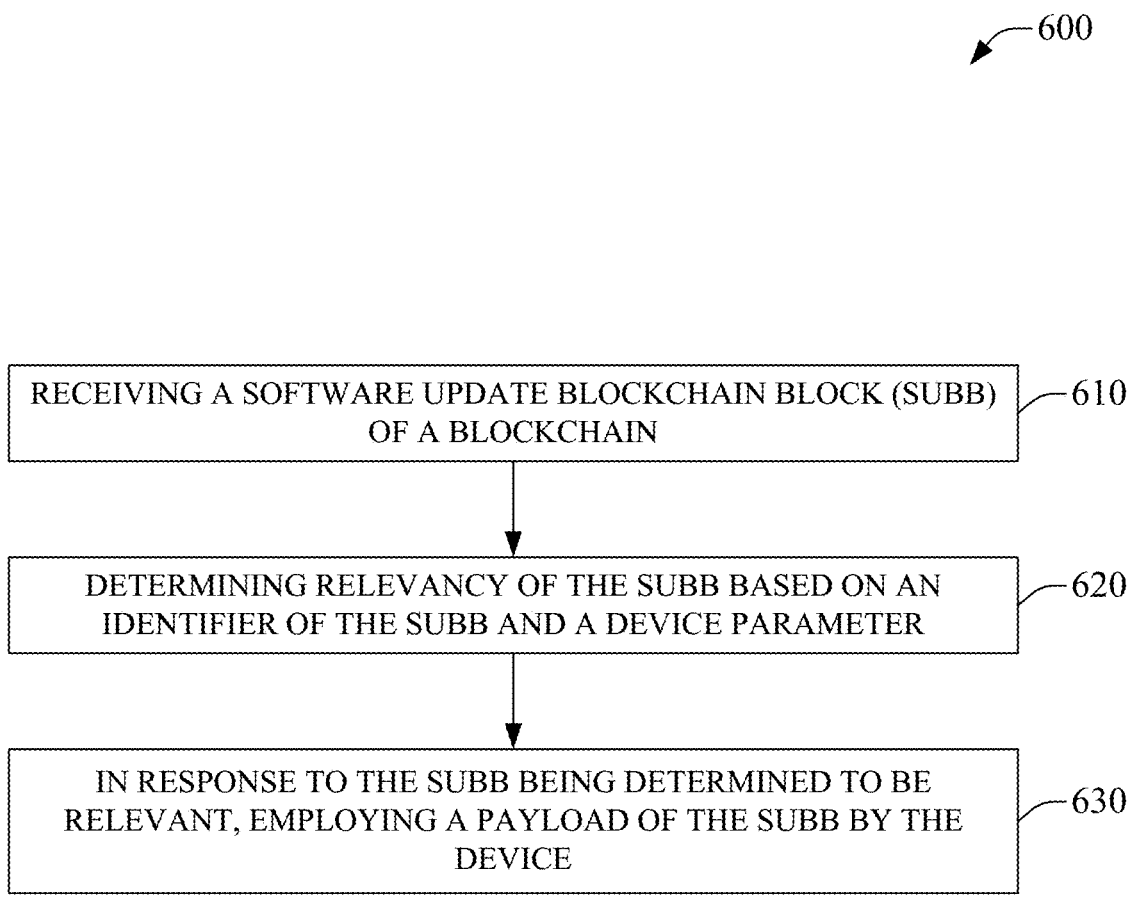
FIG. 6 is a depiction of a system that facilitates receiving computer data via a blockchain in accordance with aspects of the subject disclosure.
Figure 7:
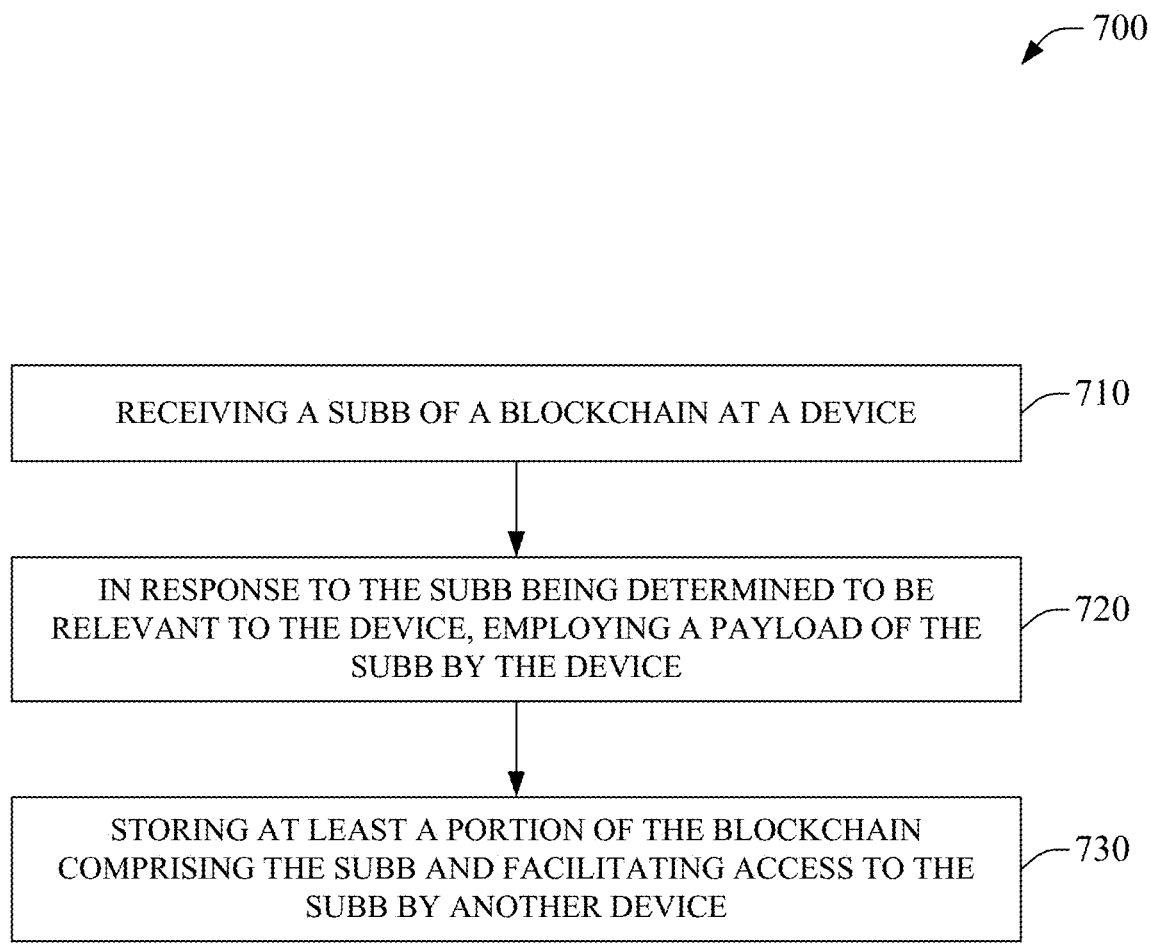
FIG. 7 illustrates a method for facilitating computer data distribution via a blockchain in accordance with aspects of the subject disclosure.
Figure 8:
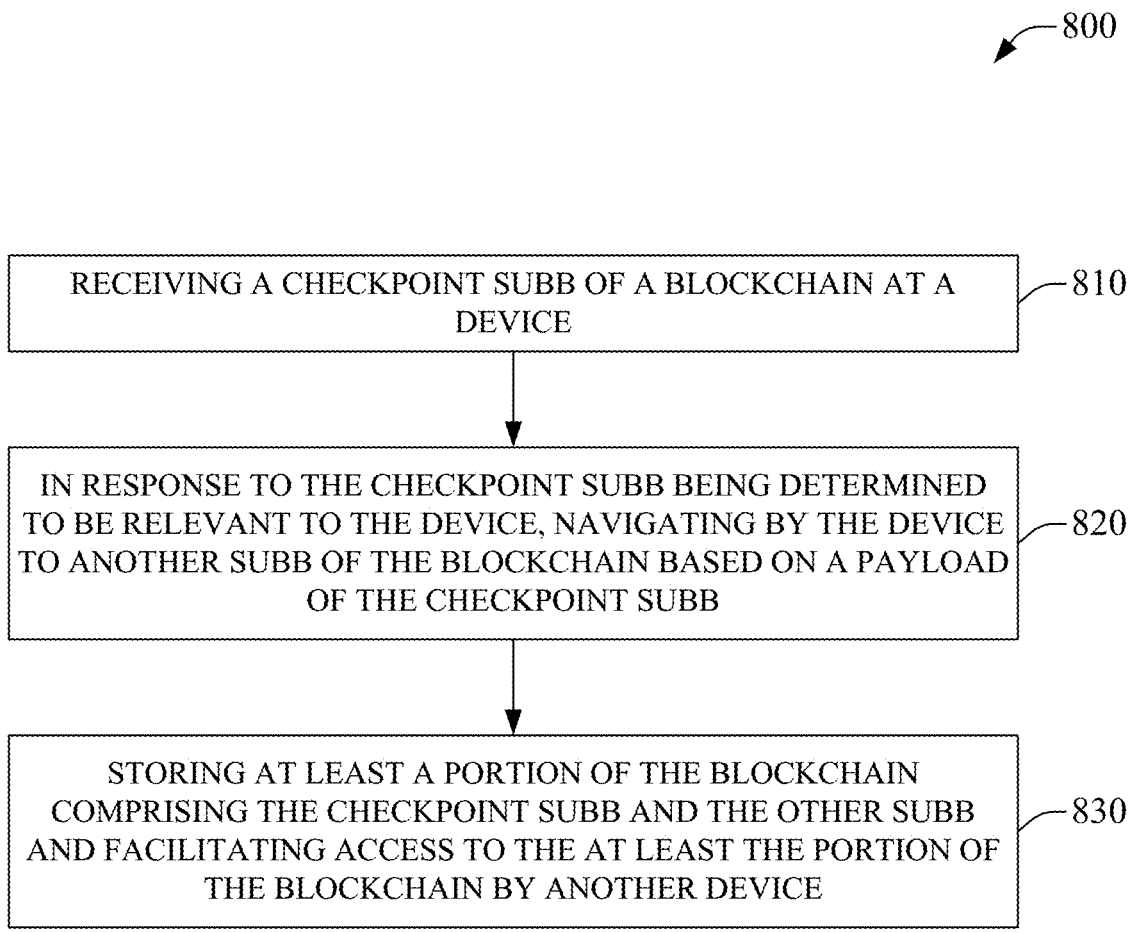
FIG. 8 illustrates a method for facilitating computer data distribution via a blockchain comprising a checkpoint block in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described.

It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of method 600 facilitating receiving computer data via a blockchain in accordance with aspects of the subject disclosure. Method 600, at 610, can comprise receiving a software update blockchain block (SUBB) from a blockchain. The SUBB can comprise a patch, e.g., code, code segment, command, data, etc. The SUBB can be received from a data store, not illustrated. The data store can be comprised in another device, e.g., a memory of another computing device, etc., a storage device, e.g., a network server, local data store, etc., a blockchain node, etc. A patch hashed in the SUBB, e.g., a payload, can be employed, at least in part, by a device to perform operations. Operations can comprise updating software/firmware, altering a state of the device, update data of the device, etc.

At 620, method 600 can comprise, determining a relevancy of the SUBB based on an identifier of the SUBB and a device parameter. The identifier can enable identification of the payload. This can be valuable in a heterogeneous device environment by allowing a device to determine, based on the identifier relative to a device parameter, if the payload is relevant for the device. Relevancy can be premised on a device parameter, for example, the type of device, model of the device, series of the device, age of the device, attributes of the device, brand of the device, code versions, etc. As an example, a device of Brand A can, from the identifier, determine that a payload is for a Brand A device and therefore determine that the payload, e.g., code, command, data, is relevant and should be employed by the device. As another example, a Brand B device using an operating system of type OS-B can determine, based on the identifier, that the payload is for a Brand A device using an operating system of type OS-B, however the Brand B device can determine that the payload is not relevant as it is for a different brand of device despite both brands using the same OS-B operating system, whereby the block can, for example, be deleted, decrypting the payload can be avoided, etc.

Method 600, at 630, can comprise employing the payload of the SUBB by the device in response to determining that the SUBB is relevant to the device. At this point method 600 can end. Where the identifier and device parameter result in determining that the SUBB is relevant at 620, method 600 can, at 630, decrypt the payload and employ the code, code segment, command, data, etc., of the payload by the device.

FIG. 7 illustrates aspects of method 700 facilitating computer data distribution via a blockchain in accordance with aspects of the subject disclosure. At 710, method 700 can comprise, receiving a SUBB from a blockchain at a device. The SUBB can comprise a patch, e.g., code, code segment, command, data, etc. The SUBB can be received from a data store, not illustrated. The data store can be comprised in another device, e.g., a memory of another computing device, etc., a storage device, e.g., a network server, local data store, etc., a blockchain node, etc. The SUBB can comprise a hash of a patch, e.g., a payload, which can be employed, at least in part, by a device to perform operations. Operations can comprise updating software/firmware, altering a state of the device, update data of the device, etc.

At 720, method 700 can comprise, in response to determining the SUBB is relevant to the device, employing the payload of the SUBB by the device. Determining relevancy of the SUBB can based on an identifier of the SUBB and a device parameter. The identifier can enable identification of the payload to allow a device to determine if the payload is relevant to the device, e.g., in a heterogeneous device environment not all payloads can be relevant to all heterogeneous devices. Relevancy can be premised on, for example, a type of device, model of the device, series of the device, age of the device, attributes of the device, brand of the device, code versions, etc. As an example, a smartphone device can determine, from the identifier, that non-smartphone payloads are not relevant. As another example, a drone device in a first geographic area can determine that a payload is relevant, where the identifier is associated with drone operations in the same, or similar, geographic area, e.g., the identifier can indicate that the payload is data for use by a drone in a first swampy area, which could be irrelevant to a drone in a desert area but can be relevant to a drone in the first swamp area or a second swampy area.

Method 700, at 730, can comprise storing a least a portion of the blockchain. The stored portion of the blockchain can comprise the SUBB. The device can then facilitate access to the stored SUBB by another device. At this point method 700 can end. In an aspect, method 700 enables the device to store up to the full blockchain. The stored portion of the blockchain can comprise the SUBB where the SUBB was determined to be relevant at 720. The device can then aid in distribution of the blockchain to other devices. This can result in decentralization of the blockchain, which can make the blockchain distribution of computer data more robust against a failure of any one distribution node. Moreover, where devices can employ less resource intensive communications technologies, accessing the blockchain at lower resource cost can be desirable, for example, rather than having to use a cellular link to access a centralized distribution node, a Bluetooth link to a nearby device having a copy of the blockchain stored can enable access to the blockchain with lower power consumption. Similarly, where the example blockchain can be spread by Bluetooth, devices can avoid needing a cellular radio component but still be able to get access to the blockchain when in range of another Bluetooth enabled device that has a copy of the blockchain stored thereon. For IoT devices, it can be beneficial to keep resource consumption low and streamline components, e.g., having only a Bluetooth radio rather than both a Bluetooth radio and a cellular radio, and a Wi-Fi radio, etc.

FIG. 8 illustrates aspects of method 800 facilitating computer data distribution via a blockchain in accordance with aspects of the subject disclosure. At 810, method 800 can comprise, receiving a checkpoint SUBB from a blockchain at a device. The checkpoint SUBB can comprise checkpoint information. The checkpoint SUBB can be received from a data store, not illustrated. The data store can be comprised in another device, e.g., a memory of another computing device, etc., a storage device, e.g., a network server, local data store, etc., a blockchain node, etc. The SUBB can comprise a hash of checkpoint information, e.g., a payload, which can be employed, at least in part, by a device to perform operations. Operations can comprise accessing another SUBB of the blockchain.

At 820, method 800 can comprise, in response to determining the checkpoint SUBB is relevant to the device, employing the payload of the checkpoint SUBB by the device. Determining a relevancy of the checkpoint SUBB can based on an identifier of the checkpoint SUBB and a device parameter. The identifier can enable identification of the payload to allow a device to determine if the payload is relevant to the device. Relevancy can be premised on, for example, a type of device, model of the device, series of the device, age of the device, attributes of the device, brand of the device, code versions, etc. Employing the checkpoint SUBB payload can comprise navigating the device to another SUBB of the blockchain based on a payload of the checkpoint SUBB. This can enable the device to avoid use of resources associated with receiving and traversing blockchain blocks between the checkpoint SUBB and the other SUBB.

The checkpoint information of the checkpoint SUBB can be based on a determination that one or more subsequent bocks of the blockchain, typically many subsequent blocks, are not relevant to a device associated with the identifier. The checkpoint information can be employed to jump ahead in the blockchain and avoid the previously identified irrelevant blocks of the blockchain. This can act as a shortcut for a device associated with the identifier of the checkpoint information. This can enable the older device to avoid consuming resources to traverse the balance of the blockchain after the checkpoint SUBB up to the other SUBB. IoT devices can frequently have limited computational, memory, and power resources available, the checkpoint SUBB can be a valuable implement to constrain resource consumption by facilitating an efficient device traverse of the entire blockchain by skipping known irrelevant blocks of the blockchain.

Method 800, at 830, can comprise storing a least a portion of the blockchain comprising the checkpoint SUBB and the other SUBB. The device can then facilitate access to the stored portion of the blockchain by another device. At this point method 800 can end. In an aspect, method 800 enables the device to store up to the full blockchain. The stored portion of the blockchain can comprise the checkpoint SUBB where the checkpoint SUBB was determined to be relevant at 820. The device can then aid in distribution of the blockchain to other devices. In addition to decentralization of the blockchain, this can aid other devices by enabling them to skip known irrelevant blocks in the shared portion of the blockchain.

Figure 9:
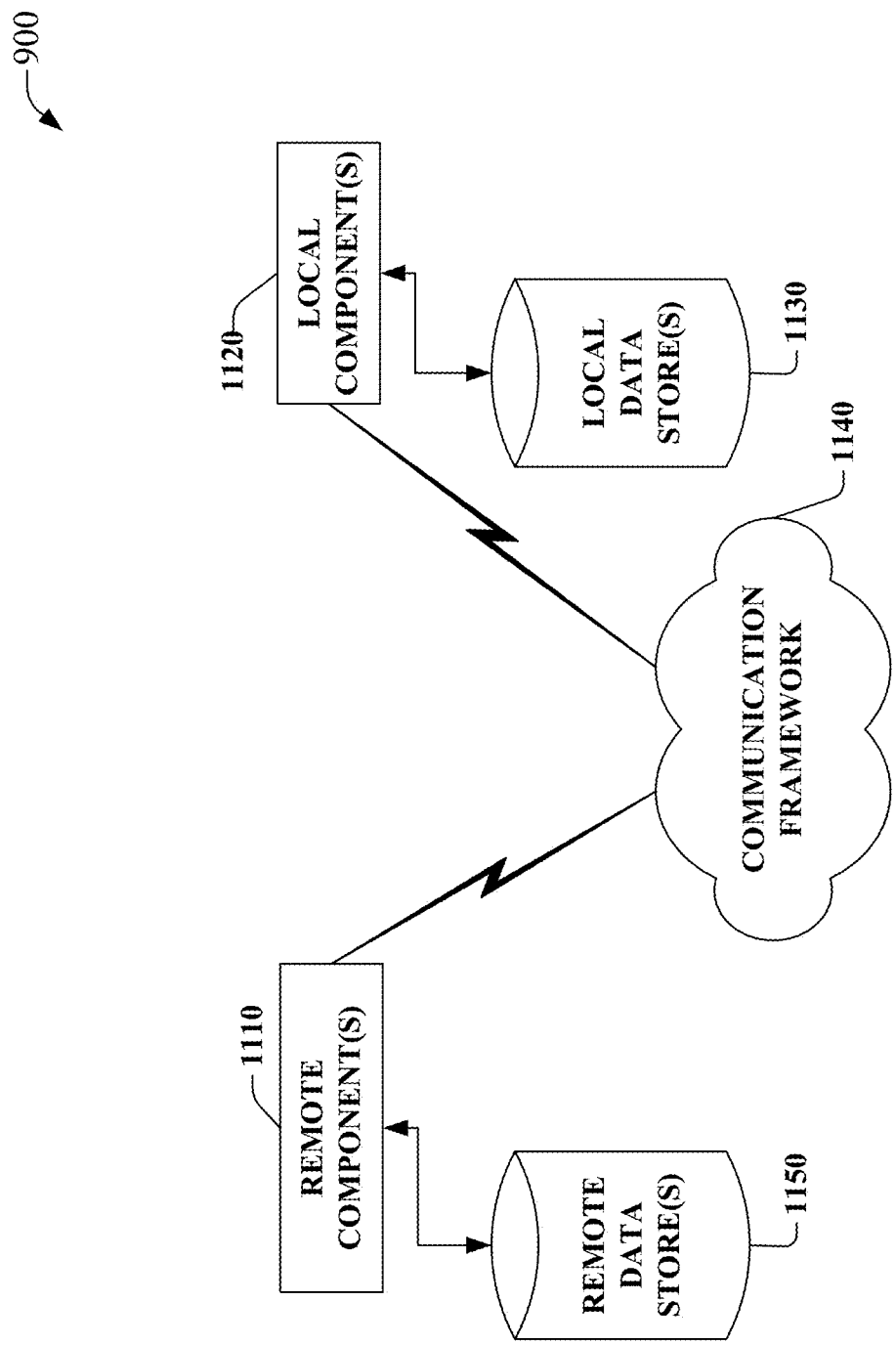
FIG. 9 depicts a schematic block diagram of a sample-computing environment with which the claimed subject matter can interact.

FIG. 9 is a schematic block diagram of a sample-computing environment 900 with which the claimed subject matter can interact. The system 900 includes one or more remote component(s) 910, which can include client-side component(s). The remote component(s) 910 can be hardware and/or software (e.g., threads, processes, computing devices). In some embodiments, remote component(s) 910 can include device 110, 210, 302, 303, 310-314, 404, 410-415, etc. As an example, remote component(s) 910 can be a home computer (remote from a virtual blockchain node component executing on a network server device(s)) that can receive SUBB, e.g., 120, 220, 230, 320-325, 330, 332, 420, 430-435, etc.

The system 900 also includes one or more local component(s) 920, which can include server-side component(s). The local component(s) 920 can be hardware and/or software (e.g., threads, processes, computing devices). In some embodiments, local component(s) 920 can include device 210, device 302, 303, 310, 314, 404, 410-415, etc. As an example, local component(s) 920 can be a device comprising signing master blockchain node component 406 that can enable access to SUBB 420 by a remote component, e.g., device 412. Subsequently, for example, device 412 can be a local component that can enable access to SUBB 432 by device 413.

One possible communication between a remote component(s) 910 and a local component(s) 920 can be in the form of a data packet adapted to be transmitted between two or more computer processes. As an example, a block of a blockchain, e.g., SUBB 120, 220, 230, 320-325, 330, 332, 420, 430-435, etc., set can be communicated between a first device, e.g., remote component 910, and a second device, e.g., a local component 920. The system 900 includes a communication framework 940 that can be employed to facilitate communications between the remote component(s) 910 and the local component(s) 920. The remote component(s) 910 are operably connected to one or more remote data store(s) 950 that can be employed to store information on the remote component(s) 910 side of communication framework 940. Similarly, the local component(s) 920 are operably connected to one or more local data store(s) 940 that can be employed to store information on the to the local component(s) 920 side of communication framework 940.

Figure 10:
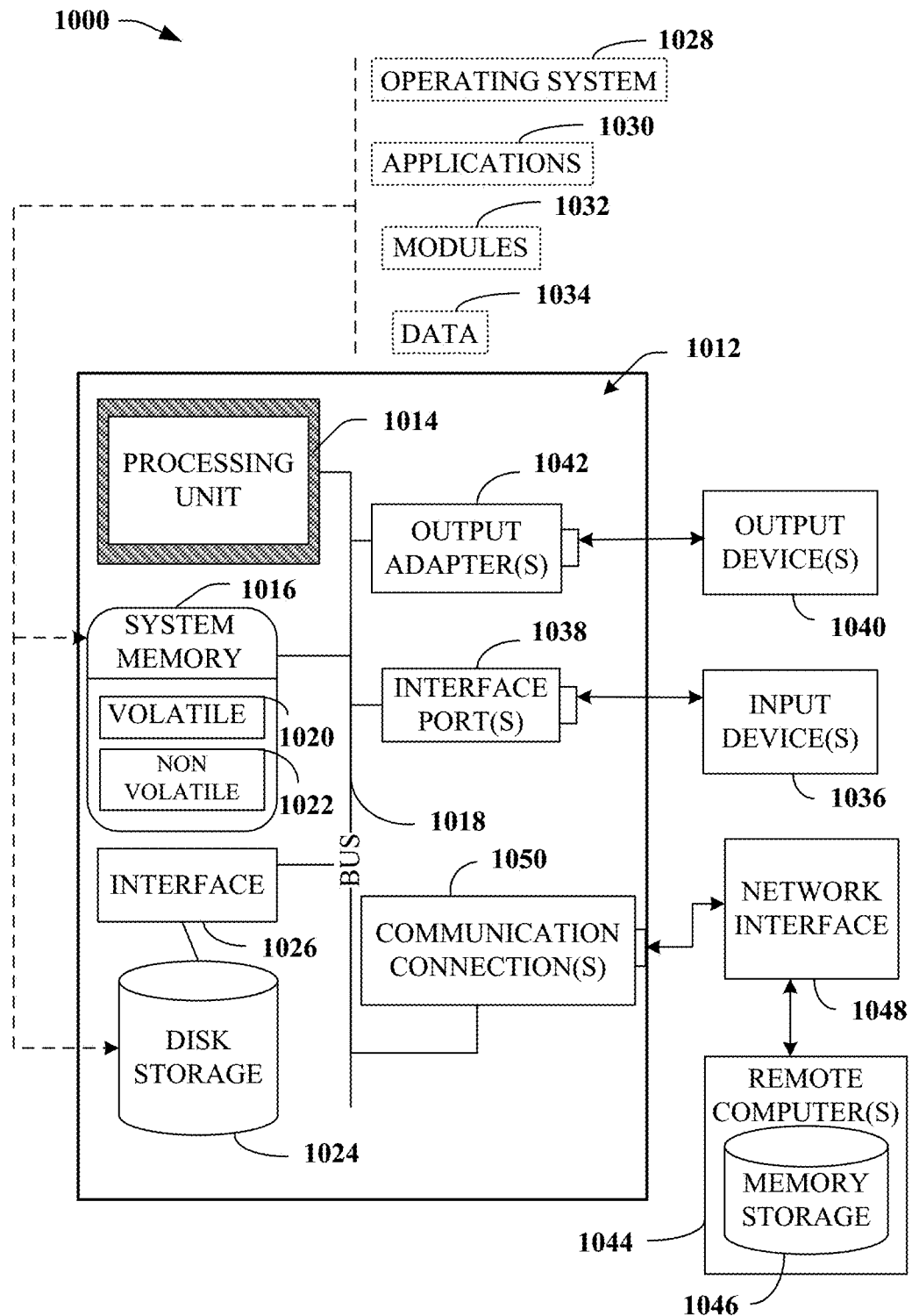
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be employed, for example, to distribute a patch, e.g., code, segment of code, command, data, etc., can include a processing unit 1014, a system memory 1016, and a system bus 1018. Computer 1012 can also comprise, for example, a blockchain node component 240, 340-344, 406, 440-445, etc. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1040 take advantage of the management of resources by operating system 1028 through program modules 1042 and program data 1044 stored either in system memory 1016 or on disk storage 1024. It is to be noted that the disclosed subject matter can be implemented with various operating systems or combinations of operating systems.

A user can enter commands or information into computer 1012 through input device(s) 1046. As an example, a developer can submit a block comprising a hash of a patch to signing master blockchain node component 406 for distribution to other devices via a blockchain architecture. The submission, for example, can be by way of a user interface embodied in a touch sensitive display panel allowing a developer to interact with computer 1012 as part of appending the block onto the blockchain. Input devices 1046 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1048. Interface port(s) 1048 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1046.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A computer-implemented method comprising:
    receiving, by a computing device, a blockchain block of a blockchain;
    determining, by the computing device, that the received blockchain block comprises a checkpoint software update blockchain block;
    determining, by the computing device, a relevancy of subsequent blocks of the blockchain to a device type that is associated with the computing device based at least on checkpoint information stored in the checkpoint software update blockchain block; and
    performing, by the computing device, a blockchain navigation operation based on the determined relevancy of subsequent blocks of the blockchain to the device type that is associated with the computing device; wherein performing the blockchain navigation operation comprises: determining to skip a quantity of blocks of the blockchain as indicated by the determined relevancy.

2. The method of claim 1, wherein performing the blockchain navigation operation comprises:
    determining to cease navigating the blockchain based on the determined relevancy indicating that none of the subsequent blocks of the blockchain are relevant to the device type that is associated with the computing device.

3. The method of claim 1, wherein the determining the relevancy of the subsequent blocks comprises determining the relevancy of the subsequent blocks to (i) the device type that is associated with the computing device, and (ii) a model of the computing device.

4. The method of claim 1, wherein the determining the relevancy of the subsequent blocks comprises determining the relevancy of the subsequent blocks to (i) the device type that is associated with the computing device, and (ii) an age of the computing device.

5. The method of claim 1, wherein the determining the relevancy of the subsequent blocks comprises determining the relevancy of the subsequent blocks to (i) the device type that is associated with the computing device, and (ii) a brand of the computing device.

6. The method of claim 1, wherein the determining the relevancy of the subsequent blocks comprises determining the relevancy of the subsequent blocks to (i) the device type that is associated with the computing device, and (ii) a code version associated with the computing device.

7. A non-transitory computer readable storage medium storing instructions executable by a data processing apparatus and upon such execution cause the data processing apparatus to perform operations comprising:
  receiving, by a computing device, a blockchain block of a blockchain;
  determining, by the computing device, that the received blockchain block comprises a checkpoint software update blockchain block;
  determining, by the computing device, a relevancy of subsequent blocks of the blockchain to a device type that is associated with the computing device based at least on checkpoint information stored in the checkpoint software update blockchain block; and
  performing, by the computing device, a blockchain navigation operation based on the determined relevancy of subsequent blocks of the blockchain to the device type that is associated with the computing device; wherein performing the blockchain navigation operation comprises:
  determining to skip a quantity of blocks of the blockchain as indicated by the determined relevancy.

8. The medium of claim 7, wherein performing the blockchain navigation operation comprises:
  determining to cease navigating the blockchain based on the determined relevancy indicating that none of the subsequent blocks of the blockchain are relevant to the device type that is associated with the computing device.

9. The medium of claim 7, wherein the determining the relevancy of the subsequent blocks comprises determining the relevancy of the subsequent blocks to (i) the device type that is associated with the computing device, and (ii) a model of the computing device.

10. The medium of claim 7, wherein the determining the relevancy of the subsequent blocks comprises determining the relevancy of the subsequent blocks to (i) the device type that is associated with the computing device, and (ii) an age of the computing device.

11. The medium of claim 7, wherein the determining the relevancy of the subsequent blocks comprises determining the relevancy of the subsequent blocks to (i) the device type that is associated with the computing device, and (ii) a brand of the computing device.

12. The medium of claim 7, wherein the determining the relevancy of the subsequent blocks comprises determining the relevancy of the subsequent blocks to (i) the device type that is associated with the computing device, and (ii) a code version associated with the computing device.

13. A system comprising: one or more processors;
  and one or more storage devices storing instructions that are executable by the one or more processors to perform operations comprising:
  receiving, by a computing device, a blockchain block of a blockchain;
  determining, by the computing device, that the received blockchain block comprises a checkpoint software update blockchain block;
  determining, by the computing device, a relevancy of subsequent blocks of the blockchain to a device type that is associated with the computing device based at least on checkpoint information stored in the checkpoint software update blockchain block; and
  performing, by the computing device, a blockchain navigation operation based on the determined relevancy of subsequent blocks of the blockchain to the device type that is associated with the computing device; wherein performing the blockchain navigation operation comprises: determining to skip a quantity of blocks of the blockchain as indicated by the determined relevancy.

14. The system of claim 13, wherein performing the blockchain navigation operation comprises:
  determining to cease navigating the blockchain based on the determined relevancy indicating that none of the subsequent blocks of the blockchain are relevant to the device type that is associated with the computing device.

15. The system of claim 13, wherein the determining the relevancy of the subsequent blocks comprises determining the relevancy of the subsequent blocks to (i) the device type that is associated with the computing device, and (ii) a model of the computing device.

16. The system of claim 13, wherein the determining the relevancy of the subsequent blocks comprises determining the relevancy of the subsequent blocks to (i) the device type that is associated with the computing device, and (ii) an age of the computing device.

17. The system of claim 13, wherein the determining the relevancy of the subsequent blocks comprises determining the relevancy of the subsequent blocks to (i) the device type that is associated with the computing device, and (ii) a brand of the computing device.

* * * * *